United States Patent
Kim et al.

(10) Patent No.: US 6,690,717 B1
(45) Date of Patent: Feb. 10, 2004

(54) MULTI-TONE TRANSCEIVER SYSTEM USING TWO STEPS OF DMT-CMFB

(75) Inventors: Jung Hak Kim, Chollabuk-do (KR); Tae Whan Yoo, Taejon (KR); Hoon Lee, Chollabuk-do (KR); Jeong Jin Lee, Taejon (KR); Jae Geun Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/498,917

(22) Filed: Feb. 4, 2000

(30) Foreign Application Priority Data

Dec. 14, 1999 (KR) ........................ 1999-57675

(51) Int. Cl.⁷ .................................. H04L 5/16
(52) U.S. Cl. ...................... 375/219; 375/222
(58) Field of Search ............... 375/219, 222, 375/260, 261, 298, 300, 296, 240; 704/203, 205, 204, 500; 370/465, 477

(56) References Cited

U.S. PATENT DOCUMENTS

| | | | |
|---|---|---|---|
| 5,128,964 A | 7/1992 | Mallory | 375/39 |
| 5,497,398 A | 3/1996 | Tzannes et al. | 375/260 |
| 5,673,290 A | 9/1997 | Cioffi | 375/260 |
| 5,715,280 A * | 2/1998 | Sandberg et al. | 375/260 |
| 6,119,080 A * | 9/2000 | Liu et al. | 704/203 |
| 6,351,473 B1 * | 2/2002 | Reusens et al. | 370/480 |

OTHER PUBLICATIONS

Cioffi, "A Multicarrier Primer," *ANSI, I1E1.4 Committee Contribution*, No. 91–157, pp. 1–18, Nov., 1991.
Sandberg et al., "Overlapped Discrete Multitone Modulation for High Speed Copper Wire Communications," *IEEE Jurnal on Selected Areas in Communications*, 10(9):1571–1585, Dec., 1995.

* cited by examiner

*Primary Examiner*—Khai Tran
(74) *Attorney, Agent, or Firm*—Seed IP Law Group PLLC

(57) ABSTRACT

A wideband multi-tone transceiver system interoperable with Asymmetric Digital Subscriber Line (ADSL) transceiver system, and including a two-step transceiver system having a discrete multi-tone transceiver system and a cosine modulated filter bank (CMFB) transmultiplexer. The two-step transceiver system provides a physically transparent transmission channel to each sub-band signal by minimizing the interference between sub-bands regardless of the transmission channel characteristics. The two-step transceiver system is realized with a comparably simple structure, and the circuit size is drastically reduced by sharing the FFT function with other sub-channels with the maximal utilization of the high-speed circuit when realizing each sub-channel's DMT modulation and demodulation function.

7 Claims, 6 Drawing Sheets

CMFB TRANSMULTIPLEXER

CMFB TRANSMULTIPLEXER ORERATING
CONCEPTION IN THE FREQUENCY DOMAIN

MULTI-TONE TRANSCEIVER SYSTEM USING TWO STEPS OF DMT-CMFB

TECHNICAL FIELD

The present invention relates to a multi-tone transceiver system for the transmission and reception of high-speed digital data at a rate of tens of Mbps through phone lines, and more particularly, to a multi-tone transceiver system having a widened bandwidth that can be interoperable with Asymmetric Digital Subscriber Line (ADSL) transceiver system.

BACKGROUND OF THE INVENTION

Most popular techniques for a digital subscriber line transmitting high-speed digital data are Discrete Multi-Tone-based Asymmetric Digital Subscriber Line (DMT-based ADSL) which is commercialized recently, and Very-high-speed Digital Subscriber Line (VDSL), which is proceeding for a standard.

The DMT transceiver system is a digital transmission technique for transmission and reception of multi-carrier, and the DMT-based ADSL is a system for transmitting high-speed digital data over the common telephone line by locating IFFT on transmission side and FFT on receiving side.

The DMT transceiver system uses 256 tones that are each 4.3125kHz wide in the downstream direction. FIG. 1 is a block diagram illustrating system architecture.

In the described DMT transceiver System, an input signal of modulator is Quadrature Amplifier Modulation (QAM) symbol type signal completed in channel coding in early phase. Considering one block as an input from 1 to 512, $1^{st}$ and 257th tone signal is zero, 2~256 tone signals are delivered from early phase, and the others are arranged in the type of signals, in Hermitian symmetric relation with 2~256th tone signals. This arranged block of signal input to the side of Inverse Fast Fourier Transform (IFFT), and the output of the side of IFFT becomes real number signal by exponential modulation. These processes are the method of DMT modulation at transmission side.

Next, the modulated symbol block of real signal is converted to serial signal by Parallel to Serial (P/S) transformer 12, than transmitted over a channel 13 in the type of serial signal. Within this process, cyclic prefix is attached prior to the block in the purpose of removing the effect of transmission channel. For example, in the case of DMT system using the bandwidth of 1.104MHz, one symbol per each tone utilizes the bandwidth of 4kHz and 0.3125kHz exists for the protection bandwidth. As a result, the number of cyclic prefix is 512×(0.3125kHz/4kHz)=40.

In the described DMT transceiver system, a receiving signal on the side of DMT demodulator contains noise in the process of signal transmission over channel from transmitter by a channel attenuation effect. After striping cyclic prefix from the received signal, the S/P transformer unit 15 transforms it to parallel signal. To facilitate this, this real vector of parallel signal transformed to the type of QAM symbol by the FFT unit 16. This is the method of the DMT demodulation.

The above-described DMT transceiver system divide transmission bandwidth to each tone using the orthogonal characteristic of IFFT/FFT, that is, the transmission bandwidth is divided into plural tones by utilizing filters that is orthogonal each other, and the corresponding filters for each tone performs an exponential modulation. But one acknowledged drawback of this system is that the cross-talk noise is significant between tones, since a difference between main node and sub node for filters, which separate the transmission bandwidth, is just 13 dB. For ideal channel, that is, a response length of impulse is shorter than that of one symbol, the signal transmitted from transmitter can be restored on receiving side completely without interference between tones since symbols of each tone have no effect on others. However, in practical channel environment of transmission, the response length of impulse is relatively long so that symbols of each tone have affected others. This effect is significant in the case of DMT system, the difference between main node and sub node is just 13dB, which divides each tone. In order to eliminate the undesirable effects between symbols, there must be enough protection area to eliminate them on the channel. In general, this protection area is called cyclic prefix, and it should be bigger than "the response length of channel impulse−1" in order to eliminate the interference between symbols. Nevertheless, the cyclic prefix is not a concerned data, the longer its length, the less real data capacity. Additional drawback of DMT system is that it is easily affected by burst noise. That is, even the burst noise has characteristics of narrow bandwidth, the difference between main node and sub node of the transceiver filter, which consists of DMT system, is just 13dB so that it has affected not only tones but also it has affected adjacent tone significantly.

As a solution for that, Time-domain Equalizer (TEQ) 14 is suggested to use illustrated in FIG. 1. TEQ is used to reduce the response length of the channel impulse, which causes Inter-Symbol Interference (ISI) so that it reduces the length of cyclic prefix ultimately. In case of general transmission channel, the length of impulse including major energy is not significantly long. Therefore if it can be collected within the certain objective length, the response length of channel impulse affected in practice can be reduced. Accordingly, using the adjustment equalizer such as TEA in the process of initializing modem can reduce the response length of the channel impulse affected in practice, so that the length of cyclic prefix can be reduced.

In the preceding description of DMT transceiver system, Frequency-domain Equalizer (FDE) 17 is used to compensate the attenuation and phase transformation caused by channels.

On the other hand, VDSL has submitted for standardization process, which is the technique for transmitting high-speed data over public telephone line faster than ADSL. Comparing to ADSL, VDSL uses broader bandwidth and transmits with better quality of data over the telephone line in relatively short distance.

As well known transmission methods of VDSL are QAM (Quadrature Amplitude Modulation) based SCM (Single Carrier Modulation) and FFT based DMT, however none of those are standardized in VDSL.

FIG. 2 is a block diagram illustrating general concept of DMT-based VDSL (Discrete Multi-Tone-based Very-high-speed Digital Subscriber Line) At the DMT-based VDSL transceiver system, a transmitter includes IFFT unit 21 and P/S transformer unit 22, and a receiver includes TEQ 24, P/S transformer unit 22, FFT unit 26 and FEQ 27. The operation of each unit in system is similar or same in accordance with FIG. 1.

Above-described DMT-based VDSL transceiver system is designed so that the bandwidth of each tone is set to 4.3125 kHz similar with ADSL transceiver system, and its utilizing bandwidth is integral number times of bandwidth of tone. In general, the standardization group set the maximum utilizing bandwidth to 17.664MHz that is 16 times of maximum utilizing bandwidth of ADSL transceiver system considering the interoperability with it. Accordingly, the maximum number of tones used in DMT-based VDSL transceiver system is 4096, and modulation/demodulation should be performed using by 8192-point IFFT/FFT.

It should be noted that, what DMT-based VDSL transceiver system is different to DMT-based ADSL transceiver system is that the size of IFFT/FFT should be bigger due to its wider bandwidth. Nevertheless, considering the present technology related to semiconductor and complexity, there is a size limit to implement FFT, consequently the allocated bandwidth cannot be utilized in complete. Another difference is that the number of TEQ tabs and cyclic prefix are big since the bandwidth used in DMT-based VDSL is wide. In addition that the operation speed of TEQ should be also faster, since the more the bandwidth usage, the more the sampling speed. That is, in case of DMT-based ADSL transceiver system using the bandwidth 1.104MHz, it utilizes about 30 tabs of TEQ and its operation speed is 2.208MHz. On the contrary, in case of DMT-based VDSL transceiver system using the bandwidth 17.664MHz, which is 16 times of 1.104MHz, it utilizes more than 400 tabs of TEQ and its operation speed is 35.328MHz. This is a significant overhead and possibly causes the delay to initialize a modem.

For multi-carrier transmission, a filter is required which can divide transmission bandwidth in to plural tones. There are two kinds of method to design a filter for this purpose. First method is to design a filter, which has a comparably wide passband and a very narrow transition band. But, to satisfy the above conditions, a very high order filter is required. Second method is to design a filter, which maintains the good orthogonal characteristic though the bands of the filter are overlapped. This method can effectively reduce the filter's order but design condition is very complicated. One of the multi-carrier transmission method, using the second filter design method mentioned above, is the one which utilizes a wavelet, and is called Discrete Wavelet Multi-tone (DWMT) transmission method. On the contrary that DMT system generally uses FFT for modulation and demodulation, DWMT uses wavelet instead of FFT. FIG. 3 illustrates the above as a simple block diagram. Wavelet block can be constructed by using Cosine-Modulated Filter Bank (CMFB) due to the fact that CMFB is beneficent in simplicity of filter design compared to other wavelet systems and in a system structure which can use fast algorithm. And, the filters, comprising the CMFB, are to be designed to have the orthogonal characteristic. But, CMFB is designed through a nonlinear optimization process so, if the size is big, the design process becomes very complex hence, it is impossible to design up to some extent of size, which is its drawback.

CMFB is a system comprised of the demultiplexer bank and the multiplexer bank. The demultiplexer bank divides an input signal in to plural frequency components and the multiplexer bank combines the divided frequency components in to one frequency component to recover the orginal signal's frequency response. Accordingly, the most important fact in designing the CMFB is that this system should be complete recovering system. CMFB design method is on that the original filter, which satisfies complete recover conditions, should be made first and then the multiplexer and the demultiplexer should be made by gathering the cosine modulated filters of these original filters. At this time, the bands, occupied by the each modulation filter, are called sub channel.

As illustrated in FIG. 4, by placing the multiplexer bank at modulation part and by placing the demultiplexer bank at demodulation part, it can be used as a transmuliplexer. The difference between this DWMT system and FFT based DMT is in that the original filter design and the characteristics of the processed signals. On the contrary that FFT has the fixed original filter by a rectangular window, CMFB makes it possible to design original filter as a user wanted type. Accordingly, by designing an original filter, which has a big difference between main and sub node, interference between sub channels can be minimized. On the contrary that FFT is exponential modulation and correspondingly the processed signals are complex numbers, but CMFB is the cosine modulation and processed signal is real numbers. DWMT transceiver is a system, which minimizes the interference between the modulation filters by applying said CMFB to modulation and demodulation, it removes the necessity of cyclic prefix, which is the fundamental drawback of DMT, and also minimizes the effect of burst noise. However, it has drawbacks such as a widened bandwidth, a technical difficulty of realizing the modulation filter in accordance with the increased tones, and a complexity of filter construction to compensate the frequency attenuation due to the channel.

The summary of the above detailed description is as follows.

The complexity of the DMT based VDSL transceiver system, presented in general conception, increases as the bandwidth increases. In general, if the size of FFT is L (L-point FFT), the complexity is expressed as $Llog_2L$, so when L increases 16 times, FFT complexity is supposed to increases 64 times. The problem is on the limitation of realization aspect of FFT, accordingly there is a limit on the size of L. Presently, it is very burdensome to realize and use more than 2048-point FFT. The reason for that is the size becomes big and the processing speed becomes slow. Accordingly, it is inevitable to give a limitation on bandwidth in designing a wideband DMT transceiver system, which is interoperable with ADSL transceiver system. The other problem is on that the length of TEQ should be linearly increased as the bandwidth is increasing, and this huge length filter should operate in high-speed. Some engineers are to construct a system without using TEQ due to the said reasons. If a system is constructed without using TEQ, performance of the system can be largely varied in accordance with the cyclic prefix length determination. But, the length of cyclic prefix can not be varied every time whenever the channel is changing so, if one intends to remove channel's effect only with the cyclic prefix, system's performance is drastically dropped if the cyclic prefix is not long enough.

SUMMARY OF THE INVENTION

The presented invention is devised to solve the problems of previous techniques. And the invention is to provide the wideband multi-tone transceiver system, which is effective in the hardware aspect and interoperable with Asymmetric Digital Subscriber Line (ADSL) transceiver system.

To achieve the above goals, the multi-tone transceiver transmitter, constructed with the presented invention of two-steps DMT-CMFB, includes DMT modulator which divides the channel coded input signal's bandwidth in to plural sub bands and performs multi-carrier modulation of those sub bands and outputs the real part of the modulated signal. And it also includes multiplexer bank of CMFB transmultiplexer which transmits real part of the signal to the channel by frequency division multiplexing. The receiver includes the demultiplexer bank of the CMFB transmultiplexer, which divides the said frequency multiplexed signal, sent through the channel, into each frequencies and separates them as each sub band signals. And also includes the DMT demodulator which performs multi-carrier demodulation of the real part of said separated sub bands and recovers an original signal which is before the modulation in transmitter.

Preferably, at least the lowest sub band among the above separated sub bands should include the ADSL band.

Additionally, the transmitter of multi-tone transceiver system, consisted of the presented invention of two-steps DMT-CMFB, includes, the first buffer which temporary stores channel coded signal, input from the front-end, and sequentially outputs as plural separated sub bands, the DMT modulator which performs multi-carrier modulation of the sub band signals. And, also includes the second buffer which temporary stores the real part of the multi-carrier modulated sub bands, and the multiplexer bank of the CMFB transmultiplexer which performs the frequency division multiplexing of the output signals from the said second buffer and sends to the channel. The receiver includes demultiplexer bank which divides the frequency division multiplexed signals, sent through said channel, in to each frequencies and separates to each sub band signals, and the third buffer which temporary stores the real part of said separated sub band signals. And it also includes the DMT demodulator, which performs multi-carrier demodulation of the sub and signals, output from the said third buffer, and the fourth buffer which temporary stores the said demodulated sub band signals and outputs the original signal of the whole bandwidth.

Preferably, at least the lowest sub band among the above separated sub bands should include the ADSL band.

More preferably, the above second buffer is constructed by the double buffer structure which includes a buffer that temporary stores the output signal from the DMT modulator, and a buffer that temporary stores the signal which is to be transferred to the multiplexer bank of said CMFB transmultiplexer.

Further preferably, the above third buffer is constructed by the double buffer structure which includes a buffer that temporary stores the output signal from the demultiplexer bank of CMFB transmultiplexer, and a buffer that temporary stores the signal which is to be transferred to the DMT demodulator.

Further preferably, it includes the time domain equalizer, which processes the signal by reading the filters' coefficient values of each corresponding band and the remained status values of the nodes from the memory. And, it also includes the frequency domain equalizer, which processes the signal by reading the filters' coefficient values of each corresponding band.

BRIEF DESCRIPTION OF THE DRAWINGS

The embodiments of the present invention will be explained with reference to the accompanying drawings, in which.

DETAILED DESCRIPTION OF THE INVENTION

Figure 5:
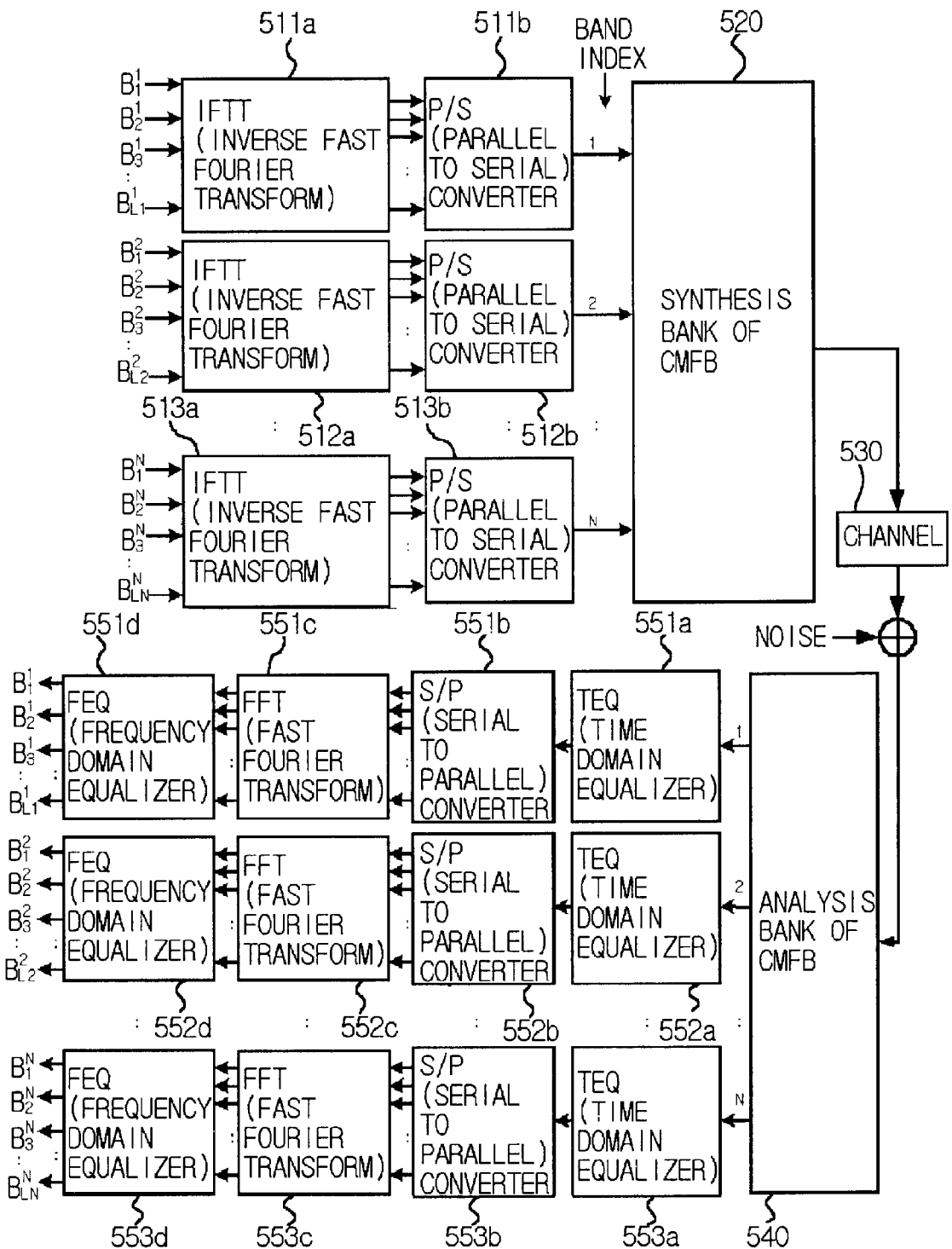
FIG. 5 is illustrating a two-step DMT-CMFB transceiver system, which is interoperable with Asymmetric Digital Subscriber Line (ADSL) transceiver system by using Cosine-Modulated Filter Bank (CMFB) and Fast Fourier Transform (FFT) as an example of the presented invention.

FIG. 5 is a block diagram illustrating a two-step DMT-CMFB transceiver system, which is interoperable with ADSL transceiver system by CMFB and FFT as an example of the presented invention.

According to FIG. 5, the presented invention of multi-tone transceiver system comprises of the plural DMT transceiver system which has a ADSL bandwidth or a wider bandwidth than that of ADSL, and the CMFB transmultiplexer located in DMT transceiver system. Each band is separated by CMFB and operated by the DMT system based on IFFT/FFT.

The DMT modulation system can be explained as follows by referencing FIG. 5. The input signal of each band's DMT modulation system is the channel coding completed one as a QAM symbol type at front end. In case of $k_{th}$ band DMT modulation system, if the input from $B^k_1$ to $B^k_{Lk}$ are regarded as one symbol block, $1^{st}$ and $((L_k/2)+1)_{th}$ tone signals are zero, from second to $(L_k/2)_{th}$ tone signals are from the front end, and rest from $(L_k/2+2)_{th}$ to $L_k$th tone signals can be comprised of the signals which have a Hermitian symmetric relationship with $(L_k/2)_{th}$ signals. IFFT module 511a, 512a, 513a processes the above blocks and outputs real part of the exponential modulated signal. This procedure is called as a multi-process method. The symbol block of modulated real part signal is processed at P/S converter 511b, 512b, 513b and transmitted at the channel as a serial signal format. During this process, a cyclic prefix is attached in front of the serial signal block.

The DMT demodulation system can be explained as follows by referencing FIG. 5. At the receiver, the cyclic prefix is removed from the transmitted signal and series signal is converted to parallel one through S/P converter 551b, 552b, 553b, and this real part of parallel signal vector is processed at FFT module then signal is recovered to QAM symbol type. This procedure is called as an inverse multi-process method.

At the above DMT demodulation system, the TEQ 551a, 552a 553a, connected in front of the S/P converter 551b, 552b, 553b, is the filter to reduce the ISI inducing channel impulse response. The FEQ 551d, 552d, 553d, connected in the rear of FFT, is a filter for the compensation of attenuation due to the channel, performing the complex number computation due to the QAM type complex number output from the FFT. TEQ and FEQ are comprised of the values from the series of initialization process before the meaningful signal is transmitted. And, after the initialization, it is possible to have an adaptive equalizer structure to reduce errors ceaselessly by transmitting the training signal during the real data transmission.

Figure 1:
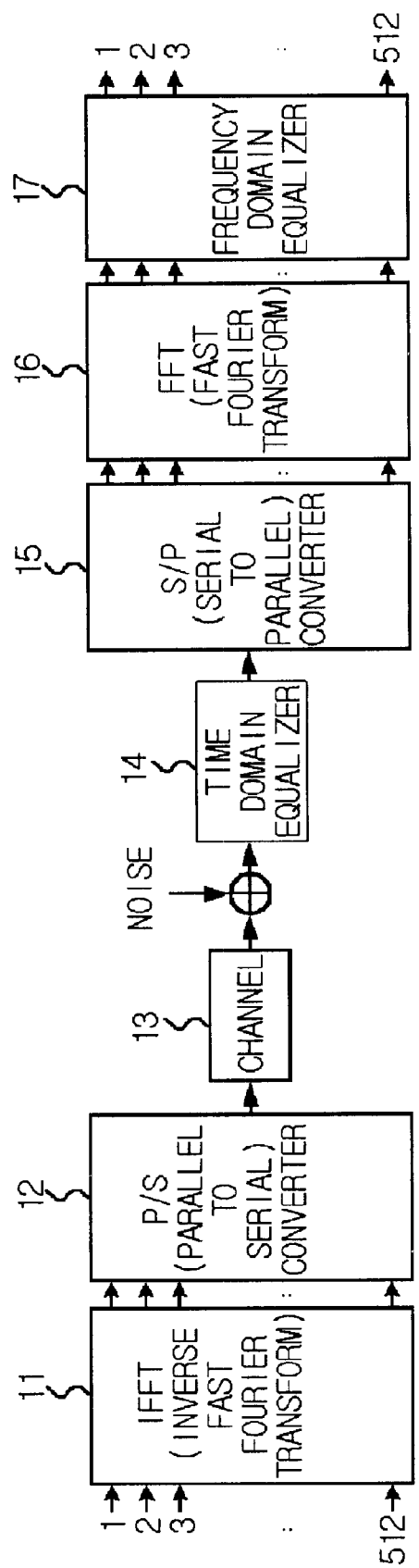
FIG. 1 is a block diagram illustrating a general Discrete Multi-Tone (DMT) Asymmetric Digital Subscriber Line (ADSL) transceiver system.
Figure 2:
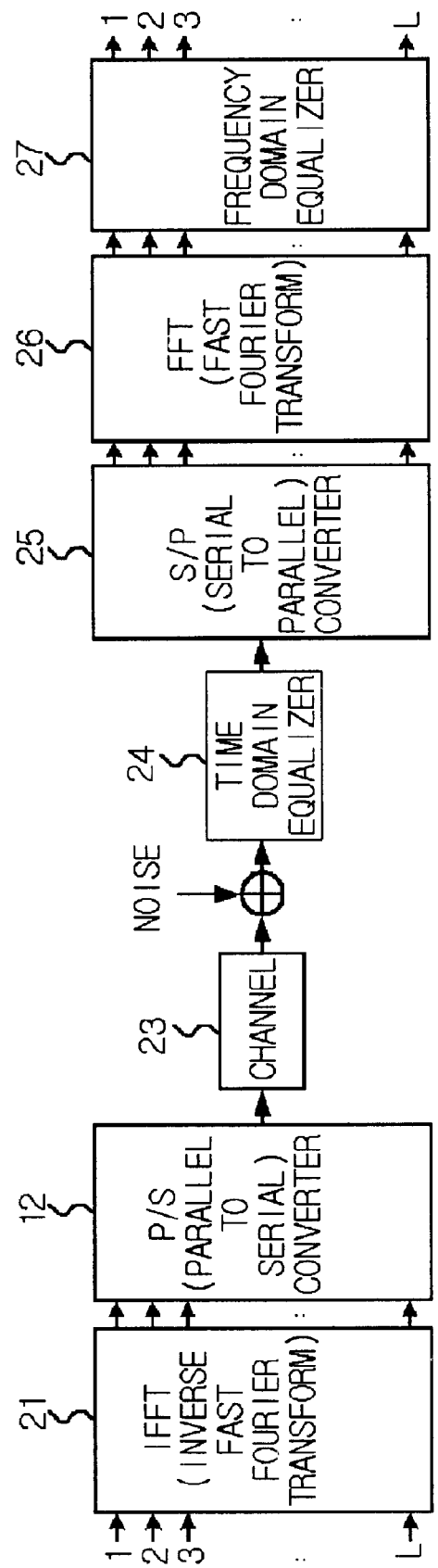
FIG. 2 is a block diagram illustrating a general conception of Discrete Multi-Tone (DMT) Very-high-speed Digital Subscriber Line (VDSL).
Figure 3:
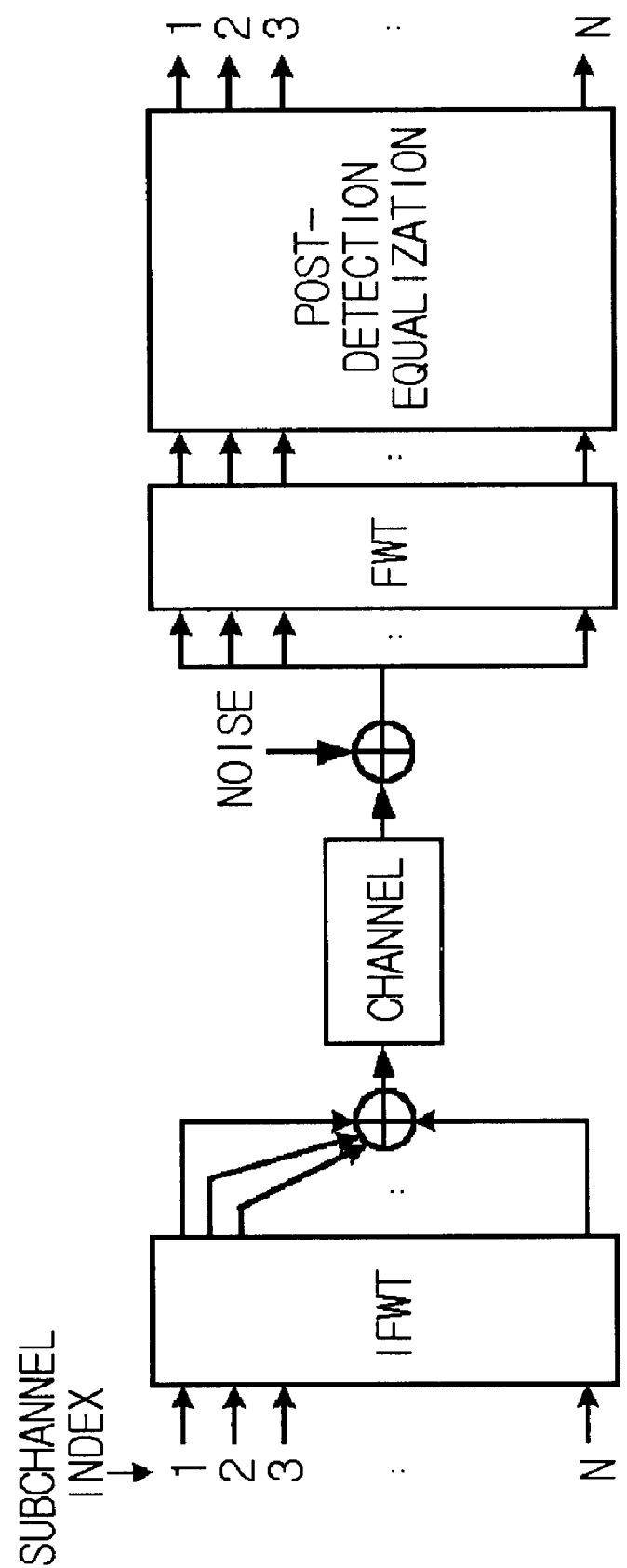
FIG. 3 is a block diagram illustrating a general Discrete Wavelet Multi-Tone (DWMT) transceiver system.
Figure 4:
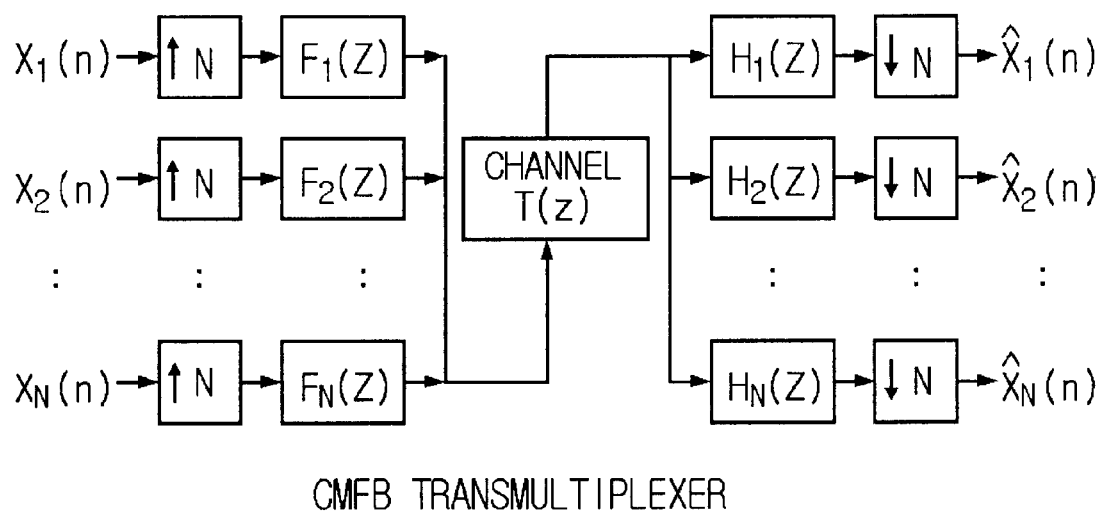
FIG. 4 is a block diagram illustrating a general Cosine-Modulated Filter Bank (CMFB) transmultiplexer.
Figure 4:
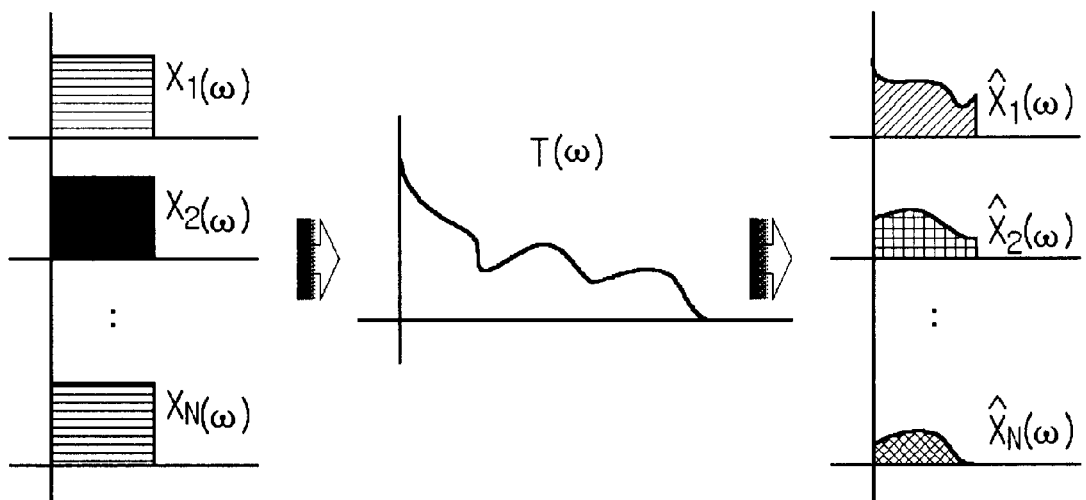

The CMFB transmultiplexer operation can be explained as follows by referencing FIG. 5. The multipixer bank 520 and demultiplxer bank 540 are systems consist of cosine modulated filters of the well designed original filters. If this CMFB is used as FIG. 4, it becomes Frequency Division multiplexing (FDM) transmultiplexer. The real part of the signals, which is output from each band's P/S converter 511b, 512b, 513b and cyclic prefix is added, is input to the CMFB multiplexer bank. And these real part signals of each these sub bands are cosine modulated by the mutiplexer bank 520 and added up at those output. The above procedure is transmultiplexer modulation method.

The modulated signal is passing the demultiplexer bank 540 of CMFB after passing the channel 530. The demultiplexer bank acts as dividing the input signal in to each sub bands by using the orthogonal characteristic of the cosine modulated filter. This procedure is transmultiplexer demodulation method.

The diagram in FIG. 5 shows that the multiplxer bank 520 and demultiplxer bank 540 is added up at the input and the output, respectively, without changing the basic structure of DMT. This is to provide a physically transparent transmission channel to each sub band signals by designing the CMFB for minimizing the interference between sub bands regardless of the transmission channel characteristics, and is to transfer the transmission channel characteristics of regarding transmission bandwidth directly to each band's DMT system. Correspondingly, in each DMT system, the initialization procedure of TEQ and FEQ are performed independently. But, to be operated independently for each DMT system, each channel characteristic should be transferred to each sub band without any distortion, and correspondingly, CMFB should be a perfect recovering system.

The required CMFB design conditions are different to those of DWMT. In case of DWMT, because sub channel filters should have narrow bandwidth for having a robust structure against the burst noise, large numbers of sub channel and the comparably small interference between the sub channels are preferable. On the contrary, the CMFB transmultiplexer of the presented invention should satisfy the condition of complete recovering system to provide a physically transparent transmission channel for the sub channel signals. It is not necessary to be a narrow bandwidth characteristic because it is not for constructing the robust structure against burst noise. And the number of sub channels is fixed because it just divides the transmission bandwidth as the number of fixed bands. Accordingly, the important factor is to decide the sub node's size of the sub channel filter. The size of sub node is related to the interference degree between the sub channels. Namely, smaller the sub node, smaller the interference degree between the sub channels. The problem is smaller the sub node, larger the filter's order. Hence, it is necessary to decide the sub node's size and the corresponding number of filter's order with a standard. Generally, the channel capacity can be the said standard. Namely, if the channel capacity is decided according to the channel environment and the transmission bandwidth, it should be possible to maintain said channel capacity though the transmission bandwidth is divided in to sub channels. Accordingly, under the condition that does not reduce the channel capacity, the size of CMFB sub channel filter's sub node and the corresponding number of filter's order should be decided.

The length of TEQ and cyclic prefix in each DMT band is related to the size of each band. So, according to the impulse response trend of the transparently transmitted channel characteristic in that band's width size, the length of TEQ and cyclic prefix can be determined. After the strategy of TEQ and cyclic prefix's length of each band's is determined, the TEQ initialization procedure is independently performed. The initialization procedure is performed as a purpose of reducing the length of each channel band's impulse response. FEQ performs the compensation of frequency attenuation characteristic and phase characteristic of that reduced channel impulse response due to the TEQ. And, it also perfonms acquiring the frequency components of each obtained channel impulse response at the TEQ initialization process, and multiplexes the inverse of those frequency components with the FFT outputs in each tone.

Figure 6:
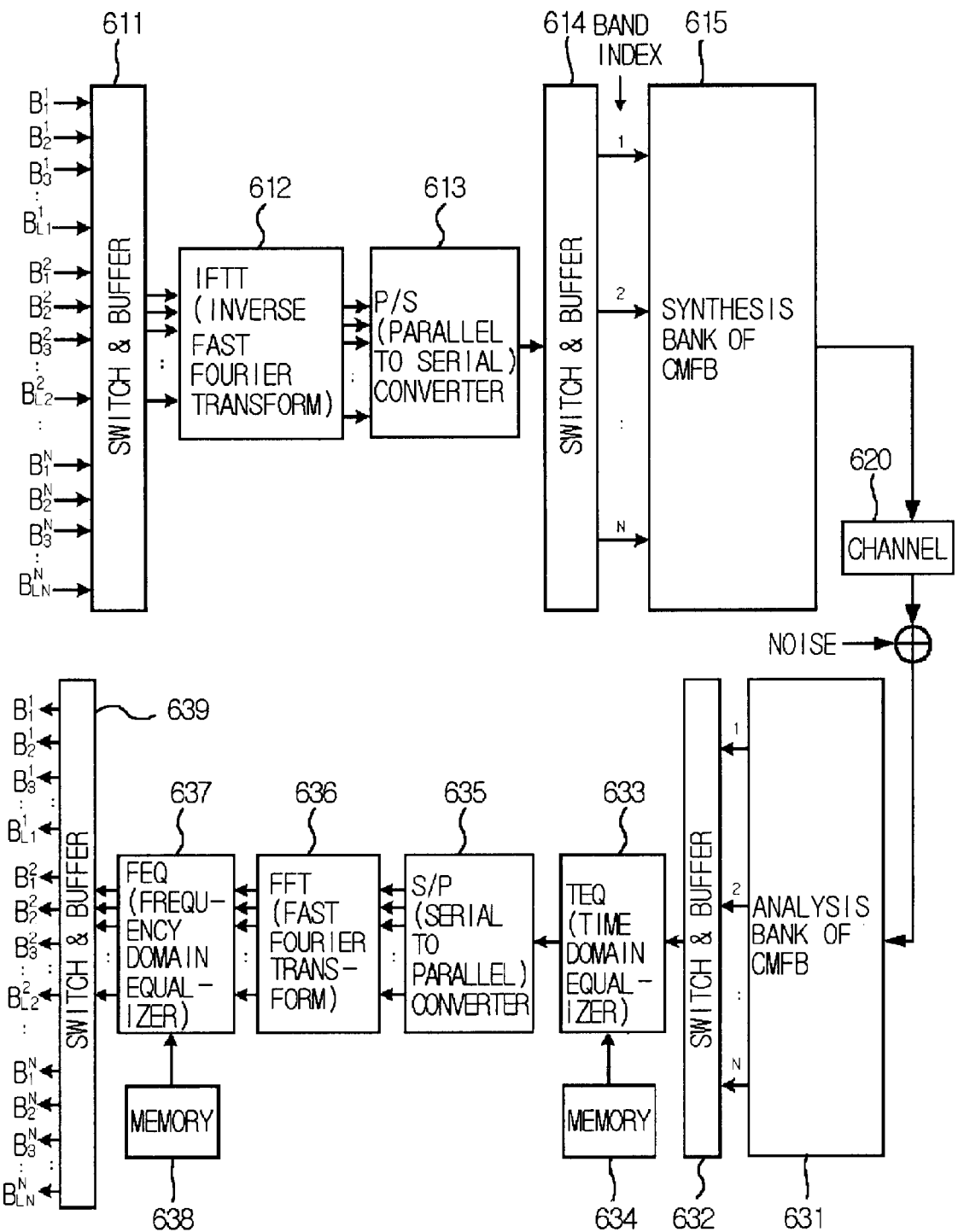
FIG. 6 is illustrating a two-step DMT-CMFB transceiver system, which is sharing Fast Fourier Transform (FFT)/Inverse Fast Fourier Transform (IFFT), Time Domain Equalizer (TEQ) and Frequency Domain Equalizer (FEQ) and is interoperable with Asymmetric Digital Subscriber Line (ADSL) transceiver system as an example of the presented invention.

FIG. 6 is illustrating a block diagram of two-step DMT-CMFB transceiver system, which is sharing FFT/IFFT, TEQ and FEQ and is interoperable with ADSL transceiver system as an example of the presented invention. In other words, FIG. 6 depicts the two-step DMT-CMFB transceiver system which shares duplicated parts of every band in FIG. 5.

The above system can be explained as follows by referencing FIG. 6. First, QAM symbolized signals, in front end, are stored to the input buffer of the switch and buffer 611, and a symbol block of a band is input to IFFT 612 sequentially through the high-speed switching circuit. IFFT 612 performs the exponential modulation, and P/S converter 613 converts and outputs the parallel output of the IFFFT 612 to serial data. From the above procedure, every band's signal is processed by IFFT and stored to the switch and buffer 614 through the high-speed switching circuit, and then a symbol of each band is output to the CMFB multiplexer bank. At this time, between the P/S converter 613 and the CMFB multiplexer 615, a double buffer is used. This is for the non-stop IFFT execution during the process of the CMFB signal. Namely, during the previous symbol block is processed, IFFT processes a new symbol block and stores to the buffer. For this purpose, a space to store the previous symbol blocks to be processed by CMFB and a space to store the new symbol block processed by IFFT are required, hence the double buffer is used.

From FIG. 6, CMFB multiplexer bank 615 performs the FDM function with an input of total N symbol blocks from each band's serial signal. This processed signal is input to the receiver's CMFB demultiplexer bank 631 through the channel 620. CMFB demultiplexer 631 performs a function of dividing the FDM signal in to each 10 frequency components. And, the output is stored to the one of double buffer of switch and buffer 632. After storing the every band's block, symbols are input to TEQ 633, in a symbol unit, through the high-speed switching circuit of the switch and buffer 632. TEQ reads the coefficients of each band's filters and the nodes status vales remained in the TEQ when processing the previous band signals, and then executes one band's symbol block length. After the one symbol block length signal is processed, the nodes status values, remained in the present TEQ, are stored to the memory and is reused when the next band signal is processed.

As stated above, when processing the band signal, TEQ reads and executes the corresponding filter coefficients and nodes status values, remained in the TEQ, and stores the nodes values, remained in the TEQ, at the memory, in the process of each band's signal. The processed signal at TEQ is converted to parallel signal through S/P converter 635 and input to the FFT part 636, and FFT part 636 demodulates the IFFT modulated signal. FEQ 637 processes the demodulated signal by reading the each band's coefficient from the memory 638. FEQ is one tab filter, which does not have remained status values, and it does not require the memory to store them. FEQ 637 processed signal is stored to the buffer through high switching of the switch and buffer 639. As illustrated in FIG. 5, because FFT and IFFT parts are already determined system in hardware, the system can be constructed in a FFT and IFFT shared structure by placing and operating one FFT and one IFFT, which can cover every band's FFT and IFFT size in high speed. Or by placing and operating one FFT and IFFT, which can cover the every set of band's FFT and IFFT size where the set of band consists of certain band's group in high speed. And, because filter's coefficients are determined at the modem initialization process, when storing each band's TEQ and FEQ filter coefficient to the memory and processing the signal by sharing TEQ and FEQ hardware, only the concerned band's filter coefficients are read to hardware and are calculated. Correspondingly, the realized circuit size can be drastically reduced.

Although representative embodiments of the present invention have been disclosed based on the good realizable examples, these examples are not to confine the invention but to give illustrative examples. For those who are skilled in the field where this invention is belonged will appreciate that various modifications, additions and substitutions are possible without departing from the scope and sprit of the present invention as defined in the accompanying claims and the equivalents thereof.

What we claim:

1. A multi-tone transceiver system using two steps of a discrete multi-tone (DMT) modulation/demodulation and cosine-modulated filter bank (CMFB), comprising:

a cosine-modulated filter bank (CMFB) for dividing a bandwidth of a channel-coded input signal into a plurality of sub-bands.

a transmitter, wherein the transmitter includes a plurality of discrete multi-tone (DMT) modulators, each DMT modulator corresponds to each of the sub-bands and performs multi-carrier modulation for a signal of each sub-band and outputting a real-numbered signal; and a synthesis bank that multiplexes real-numbered signals from the DMT modulators by a frequency division multiplexing and transmits a multiplexed signal to a transmission channel; and a receiver, wherein the receiver includes an analysis bank configured to divide the signal received from the transmitter through the transmission channel into a plurality of real-numbered signals; and a plurality of discrete multi-tone (DMT) demodulators, each of the DMT demodulators corresponds to each of the real-numbered signals and performs multi-carrier demodulation for each real-numbered signal and recovers an original signal of the sub-band.

2. The system of claim 1, wherein at least a lowest sub-band of the plurality of sub-bands includes an asymmetric digital subscriber line ADSL band.

3. A multi-tone transceiver system using two steps of discrete multi-tone (DMT) modulation/demodulation and cosine-modulated filter bank (CMFB), comprising:

a cosine-modulated filter bank (CMFB) for dividing a bandwidth of a channel-coded input signal into a plurality of sub-bands;

a transmitter, wherein the transmitter includes a first buffer that temporarily stores the channel-coded signal and sequentially outputs sub-band signals; a discrete multi-tone (DMT) modulator that performs multi-carrier modulation for each sub-band signal and outputs real-numbered signals; a second buffer that temporarily stores the plurality of real-numbered signals; and a synthesis bank that multiplexes the plurality of real-numbered signals from the second buffer by a frequency division multiplexing and transmits a multiplexed signal to a transmission channel; and a receiver, wherein the receiver includes an analysis bank that divides the signal received from the transmitter through the transmission channel into a plurality of real-numbered signals, each of the real numbered signals corresponds to each of the sub-bands; a third buffer that temporarily stores the real-numbered signals and sequentially outputs each real-numbered signal; a DMT demodulator that performs multi-carrier demodulation for each real-numbered signal output from the third buffer and recovers original sub-band signals; and a fourth buffer that temporarily stores the recovered original sub-band signals and outputs an original channel-coded signal.

4. The system of claim 3, wherein at least a lowest sub-band of the plurality of sub-bands includes an asymmetric digital subscriber line (ADSL) band.

5. The system of claim 3, wherein the second buffer is composed of double buffer structure that includes a buffer that temporarily stores the output signal from the DMT modulator, and a buffer that temporarily stores an output signal, which is to be transferred to the synthesis bank of CMFB transmultiplexer.

6. The system of claim 3, wherein the third buffer is composed of double buffer structure that includes a buffer that temporarily stores the output signal from the analysis bank of CMFB transmultiplexer, and a buffer that temporarily stores an output signal, which is to be transferred to the DMT demodulator.

7. The system of claim 3, further comprising:

a time domain equalizer that is a digital filter composed of tabs and registers and processes the output signal from the third buffer by reading the tab coefficient values and the remained status values of registers from memory; and a frequency domain equalizer that is an assembly of digital filters, each of which is composed of one tab, and processes the output signal from fast Fourier transform processor in the DMT demodulator by reading the tab coefficient values from memory.

* * * * *